United States Patent
Poisner (10) Patent No.: US 10,247,752 B2
(45) Date of Patent: Apr. 2, 2019

(54) APPARATUS, METHOD, AND SYSTEM FOR DETECTING ACCELERATION AND MOTOR MONITORING

(71) Applicant: Intel Corporation, Santa Clara, CA (US)

(72) Inventor: David I. Poisner, Carmichael, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/457,919

(22) Filed: Mar. 13, 2017

(65) Prior Publication Data

US 2017/0184625 A1    Jun. 29, 2017

Related U.S. Application Data

(63) Continuation of application No. 14/571,222, filed on Dec. 15, 2014, now Pat. No. 9,594,093.

(51) Int. Cl.
G01P 15/093    (2006.01)

(52) U.S. Cl.
CPC .................. G01P 15/093 (2013.01)

(58) Field of Classification Search
CPC ........................ G01R 33/305; G01R 33/307
See application file for complete search history.

(56) References Cited

U.S. PATENT DOCUMENTS

| | | | |
|---|---|---|---|
| 5,837,998 A | 11/1998 | Dinev et al. | |
| 6,039,747 A | 3/2000 | Shturman et al. | |
| 8,725,429 B2* | 5/2014 | McNeill | E21B 17/01 702/34 |
| 9,097,505 B2 | 8/2015 | Andersen et al. | |
| 2004/0243351 A1 | 12/2004 | Calkins et al. | |
| 2005/0189479 A1 | 9/2005 | Su | |
| 2007/0073502 A1 | 3/2007 | Umeda | |
| 2007/0247613 A1 | 10/2007 | Cloutier et al. | |
| 2008/0310848 A1* | 12/2008 | Yasuda | G02B 6/4416 398/115 |
| 2010/0006784 A1 | 1/2010 | Mack et al. | |
| 2011/0277548 A1 | 11/2011 | Andersen et al. | |

(Continued)

OTHER PUBLICATIONS

International Preliminary Report on Patentability for International Patent Application No. PCT/US2015/062724, dated Jun. 29, 2017.

(Continued)

*Primary Examiner* — Tony Ko
(74) *Attorney, Agent, or Firm* — Green, Howard & Mughal LLP (57) ABSTRACT

Described is a system which includes: a cable including: a first fiber optic interconnect to provide an input light; and a second fiber optic interconnect to provide an output light; and a first housing coupled to the cable, the first housing including: a first deflection circuit to deflect the input light received from the first fiber optic interconnect in response to a vibration or movement of the first housing; and a second housing coupled to the cable, the second housing including: a light source to generate the input light for transmission to the first deflection circuit via the first fiber optic interconnect; and a photo detector to receive the output light from the first deflection circuit via the second fiber optic interconnect.

20 Claims, 5 Drawing Sheets

(56) References Cited

U.S. PATENT DOCUMENTS

2013/0327146 A1 12/2013 Meyer et al.
2014/0263961 A1 9/2014 Wang

OTHER PUBLICATIONS

International Search Report and WrittenOpinion for International Patent Application No. PCT/US15/62724 dated Mar. 9, 2016, 12 pages.
Non-Final Office Action for U.S. Appl. No. 14/571,222 dated May 16, 2016, 9 pages.
Notice of Allowance for U.S. Appl. No. 14/571,222 dated Oct. 27, 2016, 8 pages.
Supplementary Partial European Search Report for European Patent Application No. 15870628.3, dated Mar. 20, 2018.
Extended European Search Report for European Patent Application No. 15870628.3, dated Jun. 22, 2018.

* cited by examiner

APPARATUS, METHOD, AND SYSTEM FOR DETECTING ACCELERATION AND MOTOR MONITORING

CLAIM FOR PRIORITY

This application is a continuation of U.S. patent application Ser. No. 14/571,222, filed on Dec. 15, 2014, entitled "APPARATUS, METHOD, AND SYSTEM FOR DETECTING ACCELERATION AND MOTOR MONITORING" and issued as U.S. Pat. No. 9,594,093 on Mar. 14, 2017, which is incorporated by reference in its entirety.

BACKGROUND

Accelerometers are used in industrial environments for measuring vibrations of equipment and building structures. Accelerometers can be used to predict failure of the equipment or to find whether operation conditions are outside the prescribed limits. Semiconductor fabrication factories may have many thousands of these accelerometers to monitor vibrations in factories and its equipment.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Traditional deflection modules use Integrated Electronic Piezoelectric (IEPE) accelerometers which are a class of piezoelectric accelerometers that incorporate an electronic amplifier and use a single two-pole coaxial connector for both power input and signal output. The IEPE interface is defined in the Institute of Electrical and Electronics Engineers (IEEE) 1451.4 standard. In a traditional deflection module, power is supplied to an inner conductor of a coaxial cable from an external constant-current supply (e.g., 0.5 mA to 8 mA). The output signal from the traditional deflection module is also on the inner conductor, and consists of an Alternating Current (AC) voltage centered on a bias voltage (e.g., a bias voltage of about 8V to 12V). The output voltage is bounded at the lower end by the saturation voltage of the integrated IEPE amplifier (e.g., 0.5V to 2V), and at the upper end by the maximum compliance voltage of the current source (which may be anything between about 6V and 30V). High voltage appearing on a vibrating module (e.g., motor chassis) can couple to the output signal and may distort the acceleration data.

The existing industrial accelerometers are expensive (e.g., $150 to $400 per accelerometer), measure only a single axis (i.e., requiring multiple accelerometers per motor), require an expensive analog input/output (I/O) circuit board to digitize the analog output from the accelerometers, and use expensive coaxial cable to connect the accelerometers to the I/O circuit board. The existing accelerometer also has to be electrically isolated so that a high voltage appearing on the vibrating equipment (e.g., motor chassis) does not couple into the I/O board. With multiple accelerometers, the multichannel acquisition board, cables, and the hardware become expensive (e.g., around $1000 to $1500 per motor).

The existing accelerometers also degrade due to crystal defects and some accelerometers must be replaced regularly (e.g., every 3 to 5 years). In such cases, additional circuitry may be needed to detect when the accelerometers must be replaced. The existing accelerometers have an analog output. Analog signals are prone to noise from various sources. There is no room inside the existing accelerometers to include digitization circuits to convert these analog outputs to digital representations. Making the accelerometers bigger is not an option due to the increased mass that would impact the accuracy. The analog signals have to be sent over long distances (e.g., greater than 10 meters) and the signals may be very small (e.g., the signal may need to measure down to 1 mV). Electrical noise is a significant limitation on the accuracy of current systems. Such and other limitations are resolved by various embodiments described here.

Some embodiments are generally directed to lower-cost industrial accelerometers that allow them to be economically feasible to monitor more vibrating modules (e.g., motors). In some embodiments, a deflection circuit or module is used for a vibrating module to determine acceleration in the vibrating module. In some embodiments, the deflection circuit deflects an input light beam (e.g., a laser beam, or a Light Emitting Diode (LED) beam) such that the deflection of the light, which is received as output of the deflection circuit, is proportional to the acceleration associated with the vibrating module. In some embodiments, the deflection of the light is measured by a photo detection circuit.

In some embodiments, a system is provided which comprises a cable that includes a first fiber optic interconnect to provide an input light; and a second fiber optic interconnect to provide an output light. In some embodiments, the system includes a first housing coupled to one end of the cable. The first housing is also referred to as the first vibrating module. In some embodiments, the first housing comprises a first deflection module to deflect the input light received from the first fiber optic interconnect in response to a vibration or movement of the first housing.

In some embodiments, the system includes a second housing coupled to the other end of the cable, such that the second housing comprises a light source to generate the input light for transmission to the first deflection module via the first fiber optic interconnect. In some embodiments, the second housing also comprises a photo detector to receive the output light from the first deflection module via the second fiber optic interconnect. In some embodiments, a motor (e.g., an electric motor) is part of the first housing.

In some embodiments, the motor includes a shaft which is operable to rotate. In some embodiments, the shaft has a reflective section that reflects off light when light falls on the reflective section of the shaft. In some embodiments, the first housing includes a light source to shine light on the shaft; and a photo detector to detect light reflected off the reflective section. In some embodiments, the cable includes a group of interconnects or wires to provide power to the light source of the first housing and to carry an output of the photodetector. In some embodiments, the light source and photo detector used for measuring the rotation of the shaft are positioned outside the first housing. In some embodiments, the second housing includes a tachometer to receive the output of the photo detector of the first housing. In some embodiments, the second housing includes a processing module to process the deflected light to determine acceleration associated with the vibrating module. In some embodiments, the processing module also determines a rate of rotation of the shaft according to the output of the photodetector.

In some embodiments, the second housing may have multiple light source transmitters and photo-detectors to detect and process deflected lights from a number of deflection modules that may be placed on multiple housings (e.g., multiple motors) or multiple places on the same housing (e.g., to measure multi-dimensional acceleration of an electric motor). The accelerometer system of some embodiments also includes a tachometer to determine the rate of rotation of a rotating shaft in the first housing (or the vibrating module).

There are many technical effects of the various embodiments. For example, the accelerometer system of various embodiments significantly lowers cost (e.g., by half) than existing accelerometers (i.e., piezoelectric accelerometers). The accelerometer system of various embodiments significantly lowers installation labor costs compared to the existing accelerometer systems because there are fewer cables to install. The accelerometer system of various embodiments provides better accuracy than the existing accelerometer systems because there is no need to send analog signals over long distances from the vibrating module to a processing module.

The accelerometer system of various embodiments also exhibits better electrical isolation because fiber optic interconnects are inherently non-conductive and so when they are coupled to the deflection circuit, electrical noise is not transferred over to the fiber optic interconnects. The accelerometer system of various embodiments also places the processing module away from the vibrating module to isolate harsh conditions and environment of the vibrating module from the processing module. Other technical effects will be evident from the various embodiments described here.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, optical, or wireless connection between the things that are connected, without any intermediary devices. The term "coupled" means either a direct electrical, optical, or wireless connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one light signal, radio frequency (RF) signal, electromagnetic signal, current signal, voltage signal or data/clock signal, etc. The meaning of "a," "an," and "the" include plural references. The meaning of "in" includes "in" and "on."

The terms "substantially," "close," "approximately," "near," and "about," generally refer to being within +/−20% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors in various circuits, modules, and logic blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure.

Figure 1:
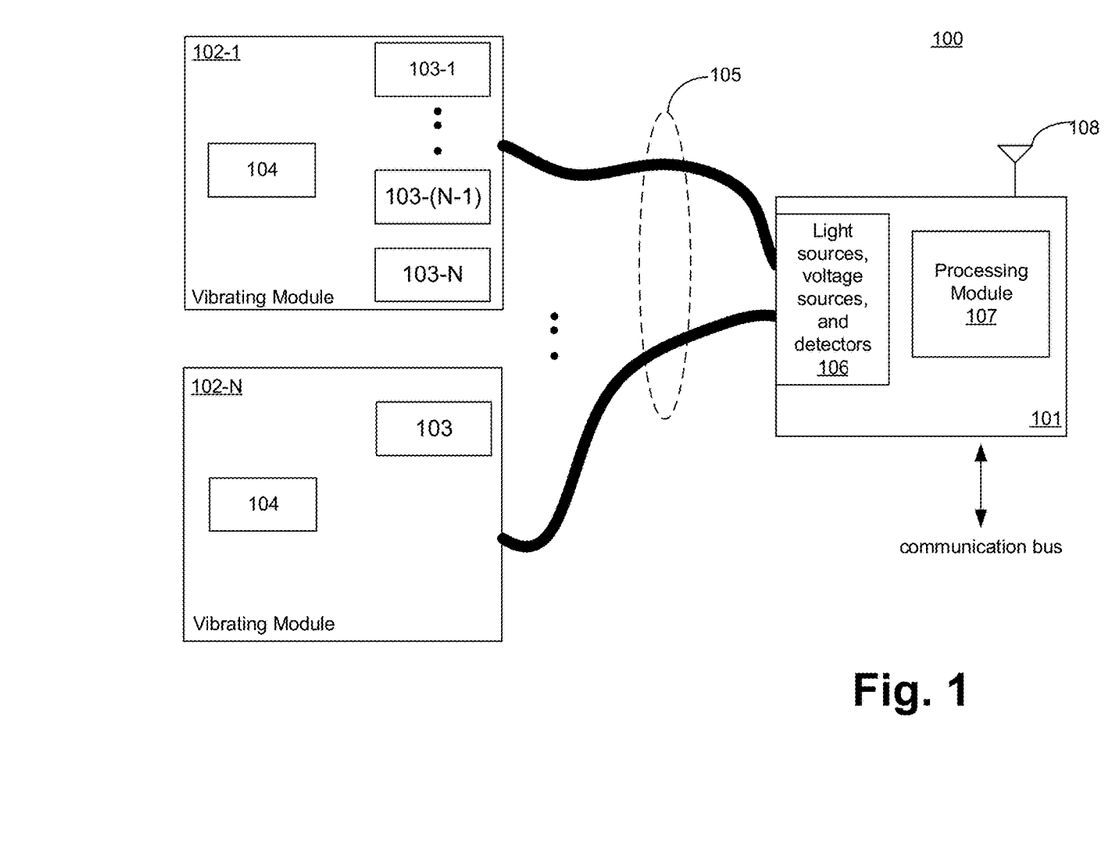
FIG. 1 illustrates a system with a vibrating module having one or more accelerometers coupled to a processing module, according to some embodiments of the disclosure.

FIG. 1 illustrates system 100 with a vibrating module having one or more accelerometers coupled to a processing module, according to some embodiments of the disclosure. In some embodiments, system 100 comprises a processing housing 101 (also referred to as the second housing), one or more vibrating modules 102-1 to 102-N (also referred to as the first housing), where 'N' is an integer; and one or more cables 105 for coupling the processing housing 101 with the one or more vibrating modules 102-1 to 102-N.

In some embodiments, processing housing 101 includes light sources, voltage source(s), and detectors (e.g., photo detectors) 106 and Processing Module 107 to process data received from a communication bus and/or light sources and detectors (e.g., photo detectors) 106. In some embodiments, processing housing 101 is a protective covering to protect a Printed Circuit Board (PCB) having light sources and detectors 106, Processing Module 107, and other circuits/modules.

In some embodiments, Processing Module 107 controls the intensity and/or wavelength of the light source (e.g., a laser or Light Emitting Diode). In some embodiments, Processing Module 107 receives output of photo detectors and processes that output to determine the acceleration associated with the vibrating module (e.g., 102-1 through 102-N). In some embodiments, Processing Module 107 can be controlled by machine executable instructions received via antenna 108 and/or the communication bus. One embodiment of Processing Module 107 is described with reference to FIG. 6.

Referring back to FIG. 1, in some embodiments, one or more cables 105 (e.g., 101-1 to 101-N) are coupled at one end to processing housing 101 and at another end to one or more Vibrating modules (e.g., 101-1 to 101-N), where 'N' is an integer. In some embodiments, Vibrating Modules include one or more deflection modules and/or one or more circuits for detecting reflected light off a rotating shaft in the Vibrating Modules. For example, Vibrating Module 102-1 includes deflection modules 103-1 through 103-N and/or a circuit 104 for detecting reflected light off a rotating shaft. In another example, Vibrating Module 102-N includes a single deflection module 102 and/or a circuit 104 for detecting reflected light off a rotating shaft. In some embodiments, circuit 104 for detecting reflected light off a rotating shaft in the vibrating module may not be included in the vibrating module. For example, circuit 104 may be separate from the vibrating module. In some embodiments, voltage source(s) in 106 may be used to provide power/ground supplies to circuit 104.

In some embodiments, cables 105 include multiple fiber optic interconnects for sending and receiving light to and from one or more deflection modules in the one or more Vibrating Modules (102-1 through 102-N). In some embodiments, cables 105 also include metal interconnects (e.g., Cu interconnects) for providing power and ground supplies, and signal path(s) for other circuits in the one or more Vibrating Modules.

For example, in some embodiments, Vibrating Modules may have circuits to flash light on a rotating shaft and to detect light reflection off the shaft. In this example, power and ground supplies are provided to the light source and/or photo detectors, and signal path is provided to send an output of photo detectors to processing housing 101. In some embodiments, circuit 104 is separate from Vibrating Module 102-1. For example, the power/ground supplies and signal wire(s) may be bundled with fiber optic interconnects in the same cable 105, but the light source for illuminating the shaft and the associated photo detector of circuit 104 are separate from Vibrating Module 102-1.

Figure 2:
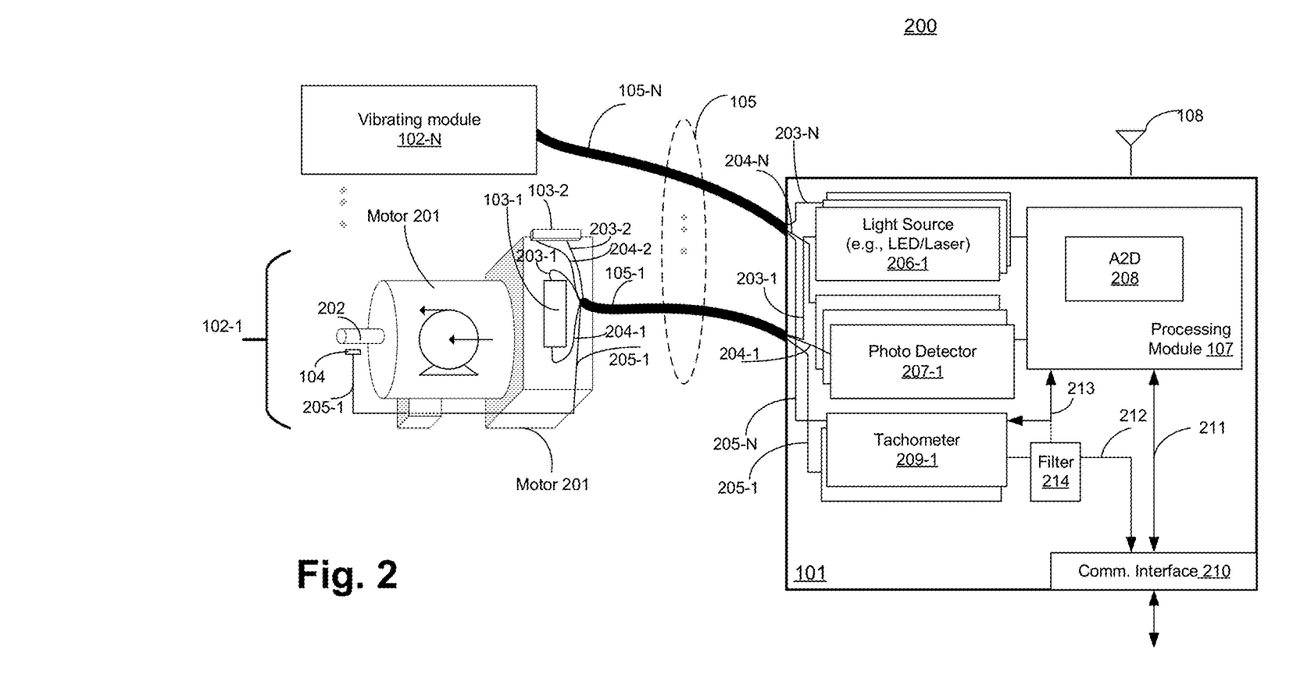
FIG. 2 illustrates a system with one or more accelerometers on a motor (e.g., electric motor) coupled to a processing module via a cable having fiber optic interconnects and/or other wires, according to some embodiments of the disclosure.

FIG. 2 illustrates system 200 with one or more accelerometers on a motor (e.g., electric motor) coupled to a processing module via a cable having fiber optic interconnects, according to some embodiments of the disclosure. It is pointed out that those elements of FIG. 2 having the same reference numbers (or names) as the elements of any other figure can operate or function in any manner similar to that described, but are not limited to such.

In some examples, a vibrating module may have a motor as the vibrating source. While various embodiments are described with reference to an electric motor being a vibrating source, other vibrating sources may also be used in the Vibrating modules. For example, gas powered engines, generators, turbines, semiconductor fabrication equipment, sections of a building, and other machines may be used as a vibrating source. In this example, Vibrating Module 102-1 is described. Similar description is applicable to other Vibrating modules.

In some embodiments, Vibrating Module 102-1 includes Motor 201 (e.g., electric motor, gas powered motor, etc.), motor shaft 202, deflection modules 103-1 and 103-2 (collectively referred to here by identifier 103), interface to cable 105-1, fiber optic interconnects 203-1, 204-1, 203-2, and 204-2; and ground/power/signal lines 205-1. In this embodiment, two deflection modules 103-1 and 103-2 are shown positioned in different orientations to detect acceleration in different axis. For example, deflection module 103-1 may provide acceleration data along a y-axis while module 103-2 may provide acceleration data along an x-axis.

In some embodiments, deflection modules 103 have a higher frequency response (e.g., up to 30 KHz) and can be used to measure large vibrations (e.g., up to 80 G's), and are durable. In some embodiments, the deflected light is captured and then processed by processing housing 101 to determine the rate of acceleration. In some embodiments, processing housing 101 provides real-time acceleration information. For example, processing housing 101 detects deflected light during vibration and provides acceleration information associated with the deflected light. The amount of deflection in the light is proportional to the acceleration.

As mentioned earlier, high voltage may appear on a vibrating module (e.g., motor chassis) which can couple to the output signal and may distort the acceleration data. To solve that problem, in some embodiments, deflection modules 103 use fiber optics for sending light and receiving deflected light to determine acceleration of the Vibrating Module without concern of the high voltage appearing on the Vibrating Module coupling to the fiber optic (because the fiber optic cables are inherently non-conductive).

In some embodiments, deflection module 103-1 receives an input light from fiber optic interconnect 203-1 and provides any deflected light (or output light) to fiber optic interconnect 204-1. In some embodiments, deflection module 103-2 receives an input light from fiber optic interconnect 203-2 and provides any deflected light (or output light) to fiber optic interconnect 204-2. While this embodiment shows two deflection modules, any number of deflection modules may be used in any location and orientation to generate multi-dimensional acceleration data.

In some embodiments, cable 105-1 also carries metal wires (e.g., Cu wires) to provide power and ground supplies, and signal return path to circuit 104. In some embodiments, circuit 104 comprises a LED or any other light source which is powered by power/ground supplies in interconnect bundle 205-1. In some embodiments, power and ground supplies are not carried by cable 105-1 and instead, local power/ground supplies (i.e., local to Vibrating Module 102-1) are used for circuit 104. In some embodiments, circuit 104 also comprises a photo detector to detect light reflected off a reflection tape on shaft 202.

For example, when shaft 202 rotates and light is focused on shaft 202, then whenever the reflection tape on shaft 202 receives the focused light, it reflects that light back to circuit 104. A photo detector in circuit 104 then converts the received light from shaft 202 to an electrical signal which is carried by the signal path (i.e., one of interconnects 205-1) to cable 105-1 and then to processing housing 101. In some embodiments, circuit 104 is separate from Vibrating Module 102-1. For example, circuit 104 may be positioned outside of Vibrating Module 102-1.

In some embodiments, processing housing 101 comprises one or more Light Sources 206-1 through 206-N, where 'N' is an integer. In some embodiments, Light Sources (generally referred to here by identifier 206) may be implemented as LEDs, lasers, etc. In some embodiments, Processing Module 107 controls various aspects of Light Sources 206. For example, Processing Module 107 may turn on/off a Light Source 206, change the intensity of light generated by Light Source 206, change the wavelength of the light generated by Light Source 206, etc.

In some embodiments, the output of Light Source 206 is transmitted to a deflection module via a fiber optic interconnect. For example, fiber optic interconnect 203-1 carries the light to deflection module 103-1, and fiber optic interconnect 203-2 carries the light to deflection module 103-2. In some embodiments, the output of Light Source 206 may also be received by other deflection modules in other Vibrating Modules. For example, fiber optic interconnect 203-N carries light to deflection module 103-N in Vibrating Module 102-N.

In some embodiments, processing housing 101 comprises one or more Photo Detectors 207-1 through 207-N, where 'N' is an integer. In some embodiments, Photo Detectors (generally referred to here as identifier 207) may be implemented as photodiodes that receive light and generate an electrical signal (i.e., voltage/current) in response to an incident light. In some embodiments, Processing Module 107 controls various aspects of Photo Detector 207. For example, Processing Module 107 may turn on/off Photo Detector 207, change the amplification of the electrical signal generated by Photo Detector 207, etc.

In some embodiments, the output of deflection module(s) is received by Photo Detector 207 via a fiber optic interconnect. For example, fiber optic interconnect 204-1 carries light from deflection module 103-1 to Photo Detector 207-1, and fiber optic interconnect 204-2 carries light from deflection module 103-2 to Photo Detector 207-2. In some embodiments, the output of deflection modules in other Vibrating Modules may also be received by Photo Detector 207. For example, fiber optic interconnect 204-N carries light from deflection module 103-N positioned in Vibrating Module 102-N.

In some embodiments, the output(s) of Photo Detectors 207 is received by Processing Module 107 which processes the data to determine the acceleration associated with different deflection modules. In some embodiments, Processing Module 107 includes an Analog-to-Digital (A2D) converter to convert an analog output of Photo Detectors 207 to a digital representation of those analog signals. In some embodiments, the digital representation may be a stream of ones and zeros indicating the deflection of light, and hence the rate of acceleration associated with the deflection module. As the sequence of ones and zeros change, due to vibration in the Vibrating Module (which causes deflection module to deflect input light differently before and after the vibration), acceleration is determined.

In some embodiments, as the deflecting element in the deflection module(s) 203 moves, the amplitude of the light output from the deflection module(s) changes. In some embodiments, the deflecting element is set up such that the amplitude of the light received by the deflection module(s) 203 is proportional to the acceleration.

For example, at a neutral position (e.g., when there is no movement) of the deflection module(s) 203, 50% of the input light may be deflected. When the acceleration is in one direction (such as "up"), the deflection element moves such as to allow more of the light to pass through. At the maximum allowed upward acceleration, up to 100% of the light may pass through the deflection module(s) 203. When the acceleration is in the opposite direction (such as "down"), the deflection element lets less of the light to pass through the deflection module(s) 203. At the maximum allowed downward acceleration, as little as 0% of the light may pass through. In some embodiments, the mounting of the deflection element is such that a change in the amount of input light passing through the deflection module(s) 203 is proportional to the acceleration.

In some embodiments, processing housing 101 includes one or more Tachometers 209-1 through 209-N, where 'N' is an integer. Tachometer (generally referred to here by identifier 209) is an instrument measuring the rotation speed (or rate of rotation) of shaft 202 in Motor 201 or other machines. In some embodiments, Tachometer 209 receives a signal on conductive wire 205-1 which is the output of a photo detector in circuit 104.

In some embodiments, first housing 101 includes Filter 214 to filter the output of Tachometer 209. The filtered output 212 is then provided to Communication (Comm.) Interface 210 via bus 212 and/or to Processing Module 107 via bus 213 for further processing. In some embodiments, Processing Module 107 processes the data on bus 213 (e.g., it filters the data and converts it into a signal format for transmission by Antenna 108 or by Comm. Interface 210).

For example, Processing Module 107 receives output 213 (which in some embodiments is filtered by Filter 214) and generates a packet of data that includes samples from A2D 208 and data from Tachometer 209, and sends that packet to another device via Wi-Fi using antenna 108. In some embodiments, another conductive wire (e.g., 205-N) is used to provide signal to Tachometer 209 from another photo detector (e.g., of circuit in Vibrating Module 101-N).

In some embodiments, all interconnects from first housing 101 to Vibrating module(s) are provided by a single cable bundle 105. For example, cable bundle 105 at one end has an interface for first housing 101 and at another end has multiple interfaces for multiple Vibrating Modules. In this example, wires 105-1 through 105-N are bundled together in a single cable 105. In some embodiments, first housing 101 has multiple interfaces to interface with multiple cables 105-1 through 105-N (as shown) such that each cable is dedicated for a Vibrating Module. For example, cable 105-1 is for Vibrating Module 102-1; cable 105-N is for Vibrating Module 102-N, etc.

In some embodiments, Comm. Interface 210 is used to provide an external access to processing housing 101. For example, Comm. Interface 210 may interface with Processing Module 107 via bus 211. In some embodiments, data is sent via Comm. Interface 210 to another system (such as a server) that may provide a human user interface through web services. In some embodiments, Comm. Interface 210 may provide a variety of standard and/or proprietary I/O interfaces. For example, Comm. Interface 210 may provide interfaces for Ethernet, Universal Serial Bus (USB), Thunderbolt®, etc. In some embodiments, antenna may also be used to communicate with any device in processing housing 101.

In some embodiments, antennas 108 may comprise one or more directional or omnidirectional antennas, including monopole antennas, dipole antennas, loop antennas, patch antennas, microstrip antennas, coplanar wave antennas, or other types of antennas suitable for transmission of Radio Frequency (RF) signals. In some multiple-input multiple-output (MIMO) embodiments, antennas 108 are separated to take advantage of spatial diversity. In some embodiments, processing housing 101 includes communication circuits to generate wireless signals that comply with one or more standards. For example, communication circuits may allow sending and receiving of Wi-Fi signals, Bluetooth® signals, 3G/4G signals, Long Term Evolution (LTE) compliant signals, etc. over antenna 108 to other devices.

Figure 3:
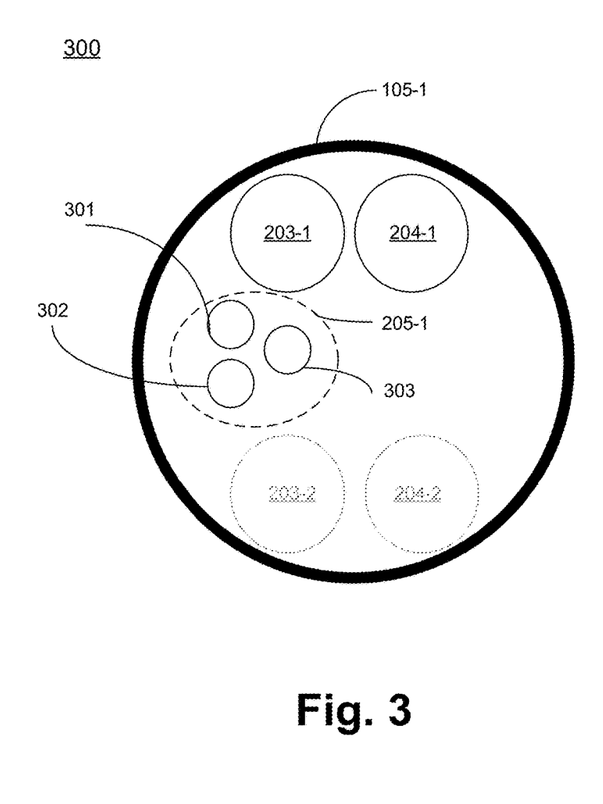
FIG. 3 illustrates a cross section of the cable carrying fiber optic interconnects and copper wires for coupling the vibrating module with the processing module, according to some embodiments of the disclosure.

FIG. 3 illustrates cross section 300 of the cable (e.g., 105-1) carrying fiber optic interconnects and copper wires for coupling the vibrating module with the processing module, according to some embodiments of the disclosure. It is pointed out that those elements of FIG. 3 having the same reference numbers (or names) as the elements of any other figure can operate or function in any manner similar to that described, but are not limited to such.

Cross section 300 shows cable cover 105-1. The cable cover 105-1 may be formed of any flexible and durable material. In some embodiments, cable 105-1 carries one or more pairs of fiber optic interconnects. In this example, Cable 105-1 includes fiber optic interconnects 203-1, 204-1, 203-2, 204-2, bundle of metal interconnects 205-1 having wire(s) 301 to carry power, wire(s) 302 to carry ground, and wire(s) 303 to carry signal from photo detector of circuit 104. In some embodiments, other wires for other circuits may also be bundled within cable 105-1.

Figure 4:
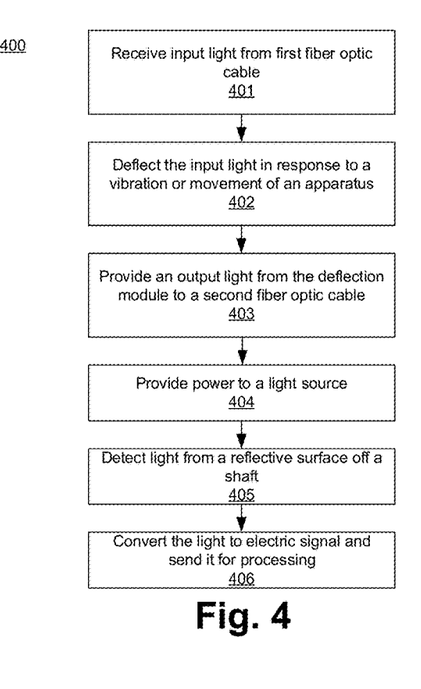
FIG. 4 illustrates a flowchart of a method performed by the vibrating module, according to some embodiments of the disclosure.

FIG. 4 illustrates flowchart 400 of a method performed by the vibrating module, according to some embodiments of the disclosure. It is pointed out that those elements of FIG. 4 having the same reference numbers (or names) as the elements of any other figure can operate or function in any manner similar to that described, but are not limited to such.

Although the blocks in flowchart 400 with reference to FIG. 4 are shown in a particular order, the order of the actions can be modified. Thus, the illustrated embodiments can be performed in a different order, and some actions/blocks may be performed in parallel. Some of the blocks and/or operations listed in FIG. 4 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 401, input light is received by deflection module 103-1 from first fiber optic interconnect 203-1 of cable 105-1. In some embodiments, the input light is generated by Light Source 206-1 (e.g., laser, LED, etc.). At block 402, deflection module 103-1 deflects the input light in response to vibration or movement of Vibration Module 102-1 (or vibration apparatus). At block 403, an output light from deflection module 103-1 is provided to second fiber optic interconnect 204-1 of cable 105-1.

In some embodiments, the output light is detected by Photo Detector 207-1 which converts the output light to an analog electrical signal. In some embodiments, A2D converter 208 converts the analog electrical signal to a digital representation and acceleration of Vibrating Module 102-1 is determined with reference to deflection module 103-1. This acceleration information can be provided to another device using the Comm. Interface 210 or via antenna 108.

At block 404, power/ground supplies are provided to a light source (e.g., LED) of circuit 104. This light source is positioned towards shaft 202 which has a reflective tape on a section of shaft 202. As shaft 202 rotates, every time light falls on the reflective tape, it is reflected back to circuit 104. While flowchart 400 shows blocks 403 and 404 to be in a sequence, blocks 403 and 404 may be performed in parallel according to some embodiments.

At block 405, the reflected light is detected by a photo detector of circuit 104 which may also be powered by the power supply provided by interconnect bundle 205-1. At block 406, the photo detector of circuit 104 converts the reflected light to an electrical signal which is then carried by a signal wire in the interconnect bundle 205-1 back to processing housing 101. In some embodiments, Tachometer 209-1 determines the rate of rotation of shaft 202 according to the electrical signal provided to Tachometer over interconnect bundle 205-1 via cable 105-1. In some embodiments, blocks 404 through 406 are performed at the same time as blocks 401 through 403.

Figure 5:
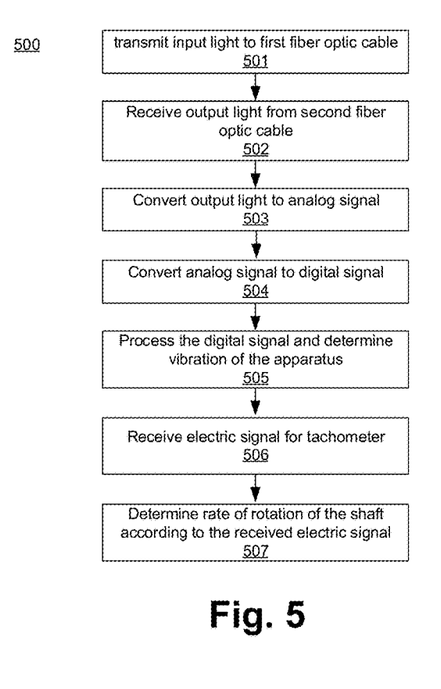
FIG. 5 illustrates a flowchart of a method performed by a processing apparatus, according to some embodiments of the disclosure.

FIG. 5 illustrates flowchart 500 of a method performed by processing apparatus of processing housing 101, according to some embodiments of the disclosure. It is pointed out that those elements of FIG. 5 having the same reference numbers (or names) as the elements of any other figure can operate or function in any manner similar to that described, but are not limited to such.

Although the blocks in flowchart 500 with reference to FIG. 5 are shown in a particular order, the order of the actions can be modified. Thus, the illustrated embodiments can be performed in a different order, and some actions/blocks may be performed in parallel. Some of the blocks and/or operations listed in FIG. 5 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 501, Light Source 206-1 provides input light to first fiber optic interconnect (or cable) 203-1 via cable 105-1 to deflection module 103-1. In response to vibration in Vibrating Module 102-1, deflection module 103-1 deflects the input light. The deflected input light is provided to second fiber optic interconnect 204-1. At block 502, the output light from second fiber optic interconnect 204-1 is received by Photo-Detector 207-1. At block 503, Photo Detector 207-1 converts the output light to an analog electrical signal. At block 504, the analog electrical signal is converted to a digital representation by A2D 209. At block 505, Processing Module 107 processes the digital signal (which may be a stream of zeros and ones). As Processor Module 107 notices the change in the digital pattern (i.e., the number of zeros and ones change due to deflection), acceleration is determined. In embodiments that have Tachometer 209, at block 506, an electric signal is received by Tachometer 208-1 from circuit 104.

While flowchart 500 shows block 506 after block 505, blocks 505 and 506 are performed in parallel according to some embodiments. At block 507, Tachometer 209 determines the rate of rotation of shaft 202 according to a voltage level of the electric signal. In some embodiments, blocks 501 through 505 are performed at the same time as blocks 506 through 507.

Figure 6:
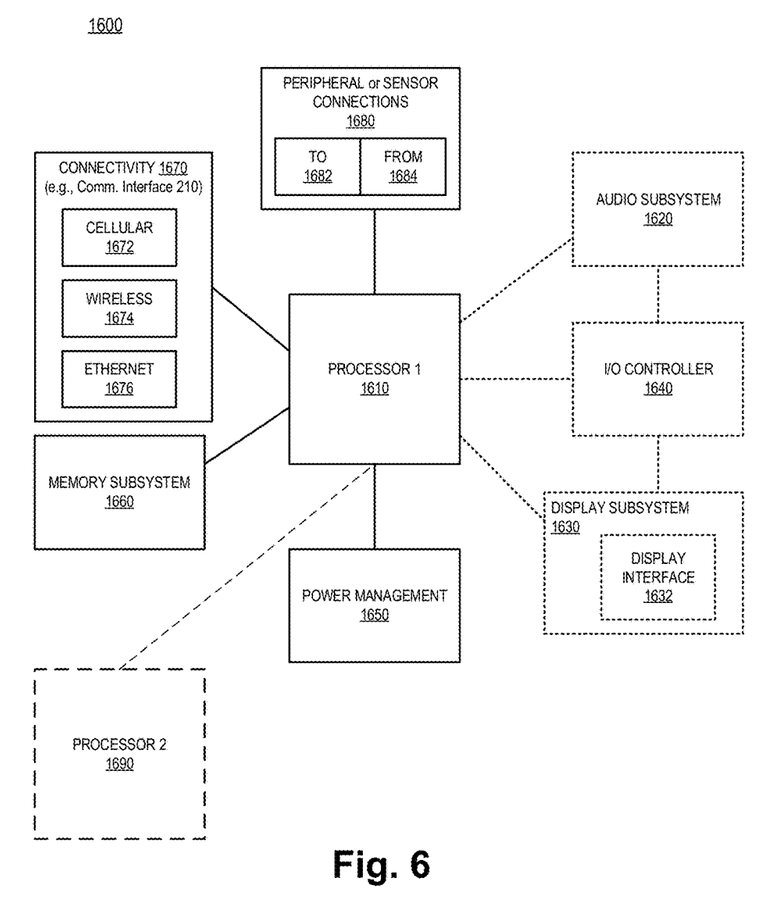
FIG. 6 illustrates a computer system or a SoC (System-on-Chip) with apparatus to measure vibration of one or more vibration modules and/or rotation rate of a shaft, according to some embodiments.

FIG. 6 illustrates a computer system or a SoC (System-on-Chip) with apparatus (e.g., Processing Module 107) to measure vibration of one or more vibration modules and/or rotation rate of a shaft, according to some embodiments. It is pointed out that those elements of FIG. 6 having the same reference numbers (or names) as the elements of any other figure can operate or function in any manner similar to that described, but are not limited to such.

In some embodiments, computing device 1600 includes a first processor 1610 with apparatus to measure vibration of one or more vibration modules and/or rotation rate of a shaft, according to some embodiments discussed. Other blocks of the computing device 1600 may also include the apparatus to measure vibration of one or more vibration modules and/or rotation rate of a shaft, according to some embodiments. The various embodiments of the present disclosure may also comprise a network interface within 1670 (e.g., Comm. Interface 210) such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. In some embodiments, audio subsystem 1620 is optional. Audio functions can include speaker and/or headphone output, as well as microphone input. Devices for such functions can be integrated into computing device 1600, or connected to the computing device 1600. In some embodiments, a user interacts with the computing device 1600 by providing audio commands that are received and processed by processor 1610.

In some embodiments, computing device 1600 includes a Display subsystem 1630. In some embodiments, Display subsystem 1630 is optional. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 includes an I/O controller 1640. In some embodiments, I/O controller 1640 is optional. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises Connectivity 1670. In some embodiments, Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672, wireless connectivity 1674, and Ethernet connectivity 1676. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication. One implementation of a connectivity is a Power-Over-Ethernet (PoE) style interface.

In some embodiments, computing device 1600 includes peripheral connections 1680. Peripheral connections (or Sensor connections) 1680 include hardware interfaces and connectors, as well as software components (e.g., drivers, protocol stacks) to make peripheral connections. It will be understood that the computing device 1600 could be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described here may also be implemented with respect to a method or process.

For example, an apparatus is provided which comprises: an interface for receiving a first fiber optic interconnect and a second fiber optic interconnect; and a deflection module, coupled to the interface, the deflection module to deflect an input light received from the first fiber optic interconnect in response to a vibration or movement of the apparatus, and to provide the deflected input light as an output light to the second fiber optic interconnect. In some embodiments, the first fiber optic interconnect is coupled to a light source which generates the input light for the first fiber interconnect. In some embodiments, the second fiber optic interconnect is coupled to a photo detector to receive the output light. In some embodiments, the output of the photo detector is received by an A2D converter. In some embodiments, the A2D converter to provide a digital output for a communication interface.

In some embodiments, the apparatus comprises: a shaft which is operable to rotate, the shaft having a reflective section; a light source to shine light on the shaft; and a photo detector to detect light reflected off the reflective section, wherein the interface receives a group of interconnects to provide power to the light source and to carry output of the photo detector. In some embodiments, at least one interconnect of the group, which carries the output of the photo detector, is coupled to a tachometer which determines a rate of rotation of the shaft.

In another example, an apparatus is provided which comprises: an interface for receiving a first fiber optic interconnect; and a light source, coupled to the interface, the light source to generate an input light for transmission to a deflection module via the first fiber optic interconnect, the deflection module to deflect the input light received from the first fiber optic interconnect in response to a vibration or movement of a housing having the deflection module. In some embodiments, the interface to receive a second fiber optic interconnect, and wherein the apparatus further comprises: a photo detector, coupled to the interface, the photo detector to receive an output light from the deflection module via the second fiber optic interconnect.

In some embodiments, the apparatus further comprises an A2D converter to receive an output from the photo detector and to generate a digital representation of the output. In some embodiments, the apparatus further comprises a communication interface for providing the output to another device. In some embodiments, the communication interface is capable to provide the output as one or more of a Wi-Fi signal, Bluetooth signal, a cellular signal, or as packets to an Ethernet cable. In some embodiments, the apparatus further comprises a tachometer to determine a rate of rotation of a rotating shaft.

In another example, a system is provided which comprises: a cable including: a first fiber optic interconnect to provide an input light; and a second fiber optic interconnect to provide an output light; a first housing coupled to the cable, the first housing including: a first deflection module to deflect the input light received from the first fiber optic interconnect in response to a vibration or movement of the first housing; and a second housing coupled to the cable, the second housing including: a light source to generate the input light for transmission to the first deflection module via the first fiber optic interconnect; and a photo detector to receive the output light from the first deflection module via the second fiber optic interconnect.

In some embodiments, the first housing is integrated into a chassis of a motor. In some embodiments, the motor is coupled to a shaft which is operable to rotate, the shaft having a reflective section, and wherein the system comprises: a light source to shine light on the shaft; and a photo detector to detect light reflected off the reflective section. In some embodiments, a group of interconnects provide power to the light source and to carry an output of the photo detector. In some embodiments, the second housing includes a tachometer to receive the output of the photo detector of the first housing. In some embodiments, the cable houses the first and second fiber optic interconnects and the group of interconnects. In some embodiments, the second housing includes an A2D converter to receive an output from the photo detector and to generate a digital representation of the output.

In some embodiments, the second housing includes a filter to filter the digital representation of the output, and wherein the communication interface provides the filtered digital representation of the output to another device. In some embodiments, the communication interface is capable to provide the filtered digital representation of the output as one or more of a Wi-Fi signal, Bluetooth signal, a cellular signal, or as packets to an Ethernet cable. In some embodiments, the second housing includes a PCB having the laser, photo detector, A2D converter, a processing element, and communication circuit positioned on the PCB.

In some embodiments, the first housing comprises: a second deflection module to deflect the input light received from a third fiber optic interconnect in response to a vibration or movement of the first housing, wherein the third optic fiber interconnect is part of the cable. In some embodiments, the cable includes a fourth fiber optic interconnect to carry an output light from the second deflection module. In some embodiments, the second deflection module is oriented differently than an orientation of the first deflection module such that the first and second deflection modules allow for multi-axis measurement of the vibration or movement of the first housing.

In some embodiments, the system comprises a third housing separate from the first housing, wherein the third housing comprises: a third deflection module to deflect an input light received from a fifth fiber optic interconnect in response to a vibration or movement of the third housing. In some embodiments, the system comprises another cable which includes: the fifth fiber optic interconnect to provide the input light to the third deflection module; and a sixth fiber optic interconnect to provide an output light from the third deflection module. In some embodiments, the other cable is coupled to the second housing.

In another example, a method is provided which comprises: receiving a first fiber optic interconnect and a second fiber optic interconnect; deflecting an input light received from the first fiber optic interconnect in response to a vibration or movement of an apparatus; and providing the deflected input light as an output light to the second fiber optic interconnect. In some embodiments, the first fiber optic interconnect is coupled to a light source which generates the input light for the first fiber interconnect. In some embodiments, the second fiber optic interconnect is coupled to a photo detector to receive the output light. In some embodiments, the output of the photo detector is received by an A2D converter.

In some embodiments, the A2D converter to provide a digital output for a communication interface. In some embodiments, the method further comprises: rotating a shaft, the shaft having a reflective section; shining a light on the shaft; and detecting light reflected off the reflective section. In some embodiments, the method comprises: converting the detected light to an output; and carrying the output to a tachometer which determines a rate of rotation of the shaft.

In another example, an apparatus is provided which comprises: means for receiving a first fiber optic interconnect and a second fiber optic interconnect; means for deflecting an input light received from the first fiber optic interconnect in response to a vibration or movement of an apparatus; and means for providing the deflected input light as an output light to the second fiber optic interconnect. In some embodiments, the first fiber optic interconnect is coupled to a light source which generates the input light for the first fiber interconnect. In some embodiments, the second fiber optic interconnect is coupled to a photo detector to receive the output light.

In some embodiments, the output of the photo detector is received by an A2D converter. In some embodiments, the A2D converter to provide a digital output for a communication interface. In some embodiments, the apparatus further comprises: means for rotating a shaft, the shaft having a reflective section; means for shining a light on the shaft; and means for detecting light reflected off the reflective section. In some embodiments, the apparatus comprises: means for converting the detected light to an output; and means for carrying the output to a tachometer which determines a rate of rotation of the shaft.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. A method comprising:
   receiving a first fiber optic interconnect and a second fiber optic interconnect, wherein the first and second fiber optic interconnects are to be housed in a cable along with power and ground lines;
   deflecting an input light received from the first fiber optic interconnect in response to a vibration or movement of a module; and
   transmitting the deflected input light as an output light to the second fiber optic interconnect.

2. The method of claim 1, wherein the module is an electric motor, and wherein the method comprises shining a light on a shaft coupled to the electric motor.

3. The method of claim 2 comprises detecting light reflected off a reflective section on the shaft.

4. The method of claim 3 comprises transmitting the detected light to another device.

5. A method comprising:
   receiving first and second fiber optic interconnects;
   generating a light;
   transmitting the light to a deflection module via the first fiber optic interconnect; and receiving a deflected light in response to a vibration or movement of a housing having the deflection module and a motor.

6. The method of claim 5 comprises converting the deflected light into an analog representation.

7. The method of claim 6 comprises converting the analog representation to a digital representation.

8. The method of claim 7 comprises providing the digital representation to another device.

9. The method of claim 5 further comprises determining a rate of rotation of a rotating shaft associated with the motor.

10. An apparatus comprising:
a first end attachable to a processing module;
a second end attachable to a vibrating module;
a covering comprising a flexible material, wherein the covering extends from the first end to the second end;
a first fiber optic cable housed within the covering;
a second fiber optic cable housed within the covering;
a power supply line housed within the covering;
a ground supply line housed within the covering; and
a signal line housed within the covering.

11. The apparatus of claim 10, wherein the processing module comprises a light source to generate an input light for transmission to the vibrating module via the first fiber optic cable.

12. The apparatus of claim 11, wherein the processing module comprises a photo detector to receive an output light from the vibrating module via the second fiber optic cable.

13. The apparatus of claim 12 comprises an analog-to-digital (A2D) converter to receive an output from the photo detector and to generate a digital representation of the output.

14. The apparatus of claim 12, wherein the processing module includes a communication interface to provide the output to another device.

15. The apparatus of claim 10, wherein the processing module includes a tachometer to receive an output from the vibrating module.

16. The apparatus of claim 15, wherein the tachometer is to determine a rate of rotation of a rotating shaft.

17. The apparatus of claim 15, wherein the output from the vibrating module comes from a photodetector via the signal supply line.

18. The apparatus of claim 10, wherein the vibrating module comprises: a housing which includes: a deflection module to deflect the input light received from the first fiber optic cable in response to a vibration or movement of the housing, wherein the housing is integrated into a chassis of an electric motor.

19. The apparatus of claim 18, wherein the electric motor comprises a shaft which is operable to rotate, the shaft having a reflective section.

20. The apparatus of claim 19, comprises:
a light source to shine light on the shaft; and
a photo detector to detect light reflected off the reflective section, wherein the light source is coupled to the power supply line and the ground supply line.

* * * * *